(12) United States Patent
Fremau et al.

(10) Patent No.: US 9,381,905 B2
(45) Date of Patent: *Jul. 5, 2016

(54) THREE-SHAFT HYBRID TRANSMISSION FOR A MOTOR VEHICLE AND CONTROL METHOD

(71) Applicant: RENAULT s.a.s., Boulogne-Billancourt (FR)

(72) Inventors: Nicolas Fremau, Saint Remy les Chevreuse (FR); Antoine Vignon, Igny (FR)

(73) Assignee: RENAULT s.a.s., Boulogne-Billancourt (FR)

(*) Notice: Subject to any disclaimer, the term of this patent is extended or adjusted under 35 U.S.C. 154(b) by 129 days.

This patent is subject to a terminal disclaimer.

(21) Appl. No.: 14/354,435

(22) PCT Filed: Sep. 18, 2012

(86) PCT No.: PCT/FR2012/052084
§ 371 (c)(1),
(2) Date: Apr. 25, 2014

(87) PCT Pub. No.: WO2013/060955
PCT Pub. Date: May 2, 2013

(65) Prior Publication Data
US 2014/0315681 A1    Oct. 23, 2014

(30) Foreign Application Priority Data
Oct. 25, 2011   (FR) ..................................... 11 59675

(51) Int. Cl.
*B60W 10/02* (2006.01)
*B60W 20/00* (2016.01)
(Continued)

(52) U.S. Cl.
CPC ................. *B60W 20/10* (2013.01); *B60K 6/48* (2013.01); *B60W 10/113* (2013.01); *B60W 20/00* (2013.01);
(Continued)

(58) Field of Classification Search
CPC ... B60W 20/10; B60W 20/30; B60W 10/113; B60W 20/00; B60K 6/48; B60K 2006/4825; F16H 2003/0931; F16H 2200/0043; F16H 2003/0826; F16H 3/093; B60Y 2400/607
USPC .............. 477/5, 3; 475/5, 182, 183, 184, 185, 475/207, 221, 317, 323, 302
See application file for complete search history.

(56) References Cited

U.S. PATENT DOCUMENTS 7,819,772 B2 * 10/2010 Tenberge ....................... 475/275
8,100,801 B2 * 1/2012 Wittkopp et al. .................. 475/5
(Continued)

FOREIGN PATENT DOCUMENTS

FR    2 811 395    1/2002

OTHER PUBLICATIONS

U.S. Appl. No. 14/129,825, filed Dec. 27, 2013, Vignon, et al.
International Search Report Issued Dec. 20, 2012 in PCT/FR12/052084 Filed Sep. 18, 2012.
French Search Report Issued Apr. 27, 2012 in French Application No. 1159675 Filed Oct. 25, 2011.

*Primary Examiner* — David J Hlavka
(74) *Attorney, Agent, or Firm* — Oblon, McClelland, Maier & Neustadt, L.L.P.

(57) ABSTRACT

A hybrid transmission for a motor vehicle including a heat engine and electric drive machine, including two primary shafts respectively connected to the heat engine and electric machine, each supporting at least one intermediate drive on a first secondary shaft connected to wheels via a differential and a second secondary shaft sending motion of a primary shaft to the differential. A first coupling between the two primary shafts can occupy at least three positions of: the heat engine is uncoupled from the drive train connecting the electric machine to the wheels, or coupled by the second secondary shaft; the primary shaft connected to the heat engine is coupled to the first secondary shaft to drive the wheels with or without support of the electric machine; the primary shaft connected to the heat engine is coupled to the primary shaft connected to the electric machine, to add respective torques thereof.

20 Claims, 7 Drawing Sheets (51) Int. Cl.
*B60K 6/48* (2007.10)
*B60W 10/113* (2012.01)
*F16H 3/093* (2006.01)
*F16H 3/08* (2006.01)

(52) U.S. Cl.
CPC ........ *B60W 20/30* (2013.01); *B60K 2006/4825* (2013.01); *B60Y 2400/421* (2013.01); *B60Y 2400/607* (2013.01); *F16H 3/093* (2013.01); *F16H 2003/0826* (2013.01); *F16H 2003/0931* (2013.01); *F16H 2200/0043* (2013.01); *Y02T 10/6221* (2013.01); *Y02T 10/6252* (2013.01); *Y10S 903/902* (2013.01); *Y10T 74/19014* (2015.01); *Y10T 477/26* (2015.01)

(56) References Cited

U.S. PATENT DOCUMENTS

| | | | |
|---|---|---|---|
| 8,226,512 B2 * | 7/2012 | Wittkopp et al. | 475/5 |
| 8,241,173 B2 * | 8/2012 | Holmes et al. | 477/3 |
| 2006/0021456 A1 | 2/2006 | Hughes | |
| 2006/0130601 A1 | 6/2006 | Hughes | |
| 2007/0191169 A1 * | 8/2007 | Fujita et al. | 475/207 |
| 2010/0120580 A1 * | 5/2010 | Mepham et al. | 477/3 |
| 2011/0111910 A1 | 5/2011 | Ideshio et al. | |
| 2011/0165984 A1 * | 7/2011 | Simpson et al. | 475/182 |
| 2012/0065015 A1 * | 3/2012 | Tamai et al. | 475/5 |
| 2012/0065016 A1 * | 3/2012 | Tamai et al. | 475/5 |
| 2014/0165780 A1 | 6/2014 | Fremau et al. | |

\* cited by examiner

THREE-SHAFT HYBRID TRANSMISSION FOR A MOTOR VEHICLE AND CONTROL METHOD

BACKGROUND

The present invention relates to the area of hybrid transmissions for motor vehicles comprising, on the one hand, a thermal engine and, on the other hand, an electric machine.

More specifically, it has as its object a hybrid transmission for a motor vehicle equipped with a thermal engine and an electric drive machine comprising two concentric primary shafts, each supporting at least one intermediate drive on a secondary shaft connected to the wheels of the vehicle.

The principal aim of hybrid transmissions is to ensure that the kinematic drive chain of a vehicle benefits from two sources of energy, thermal and electric, of which the torque contributions may be combined in a mode known as hybrid mode, or may be used separately, either in a "pure thermal mode" in which the electric machine supplies no torque to the power train, or in a "pure electric" mode in which the thermal engine supplies no torque to the power train. Other features are also required, such as the possibility of starting the thermal engine when stationary or in motion by utilizing the electric machine as a starter, or the possibility of utilizing the electric machine as a current generator for the purpose of charging the batteries.

In its most simple design, a hybrid transmission such as that outlined above ensures the totality of the required functions for a single gear reduction ratio, that is to say without the possibility of benefiting from a plurality of forward gears, as in the case of a conventional transmission.

Disclosed in publication U.S. Pat. No. 5,433,282 is a hybrid transmission for a motor vehicle composed essentially of a simple planetary gear train, of which the three outputs, the planet gear carrier, the planet gear and the ring gear, are connected to the thermal engine, to the electric machine and to the wheels of the vehicle. The thermal engine, the electric machine and the train are coaxial. A free wheel is positioned between the thermal engine and the planetary gear of the train. In particular, this makes it possible to combine the contribution made by the electric machine and by the electric machine for the purpose of driving the vehicle, and also to provide two transmission ratios. However, the possibilities which it affords for adaptation to specific types of driving, such as typically urban driving and typically extra-urban driving in pure electric mode at moderate speeds, and typically freeway driving at high speed, for example in pure thermal mode, are limited.

BRIEF SUMMARY

The present invention proposes to make available a hybrid transmission providing at least two distinct ratios in electric mode, two distinct ratios in thermal mode, and a plurality of hybrid ratios.

For this purpose, it provides a first means of coupling between the two primary shafts, capable of occupying at least three positions, in which:

the thermal engine is decoupled from the kinematic chain connecting the electric machine to the wheels, or is coupled thereto by means of the second secondary shaft (position 1), the primary shaft of the thermal engine is coupled to the first secondary shaft in order to drive the wheels with or without the contribution made by the electric machine (position 2), and the primary shaft of the thermal engine is coupled to the primary shaft of the electric machine, in such a way as to add together their respective torques in the direction of the wheels (position 3).

The thermal engine is preferably connected to a solid primary shaft, and the electric machine is connected to a hollow primary shaft.

In a first embodiment, the electric machine can be used as a single source of motive energy in two first electric ratios by closing the second means of coupling until a speed threshold is reached, from which a shift takes place to a third thermal ratio by opening the second means of coupling and by coupling the thermal engine to the wheels via the third means of coupling.

In a second embodiment, only a first electric ratio is used before changing successively to a plurality of hybrid ratios, where the first two means of coupling are locked.

BRIEF DESCRIPTION OF THE DRAWINGS

Other characterizing features and advantages of the invention will emerge clearly from a perusal of the following description of a non-restrictive embodiment thereof, with reference to the accompanying drawings, in which.

DETAILED DESCRIPTION

The transmission illustrated by the figures contains a solid primary shaft 1 connected directly by means of a system of filtration (damper hub, "damper", dual mass flywheel, or the like) 2, to the flywheel 3 of a thermal engine (not illustrated). The solid shaft 1 supports an idler pinion 4 (second idler pinion R2) capable of being connected to the latter by a first coupling system 5 (C1) such as a dog, a synchronizer or some other type of coupling, whether progressive or otherwise). A hollow primary shaft 6 is connected to the rotor of an electric machine 7, preferably (although not necessarily) of the axial discoid type machine type. Other types of electric machine can also be used within the scope of the invention, for example radial machines, permanent magnet or excitation coil machines, or reluctance machines. The hollow shaft 6 supports two fixed pinions 8, 9 for the first and third ratios. The hollow shaft 6 may be connected to the solid primary shaft 1 by means of the first coupling system 5 (C1). A first secondary shaft 10 supports two idler pinions 12 (RI) and 11 (R3), for the first and third gears, and a fixed pinion 14 for the second gear. The idler pinions 11, 12 can be connected to the primary shaft by means of a second coupling system 13 C2, such as a dog, a synchronizer or some other type of coupling, whether progressive or otherwise. The first secondary shaft 10 also supports a fixed intermediate drive 15 descending to a differential 16 connected to the wheels (not illustrated) of the vehicle.

At its left-hand extremity in the diagram, the solid primary shaft 1 supports a fixed pinion 17 for the fourth gear, in engagement with an idler pinion for the fourth gear 18 (R4), supported by a second secondary shaft 19. The second secondary shaft 19 likewise supports a third means of coupling 21 (C3) for coupling the idler pinion 18 for the fourth gear to the latter. The movement of the second secondary shaft 19 is transmitted by a drive pinion 22 to the differential 16.

Figure 6:
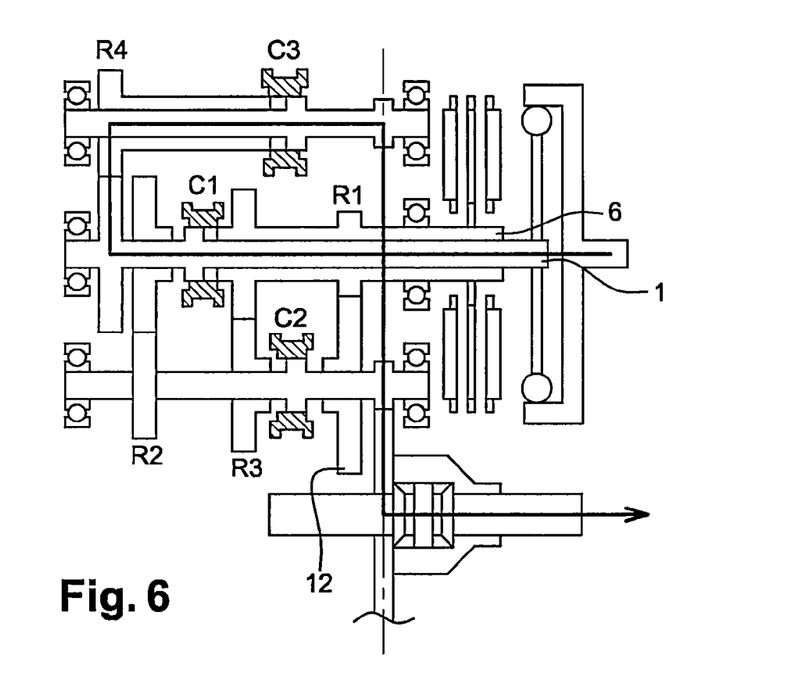
FIG. 6 corresponds to driving in hybrid mode in a first "hybrid freeway" ratio.
Figure 7:
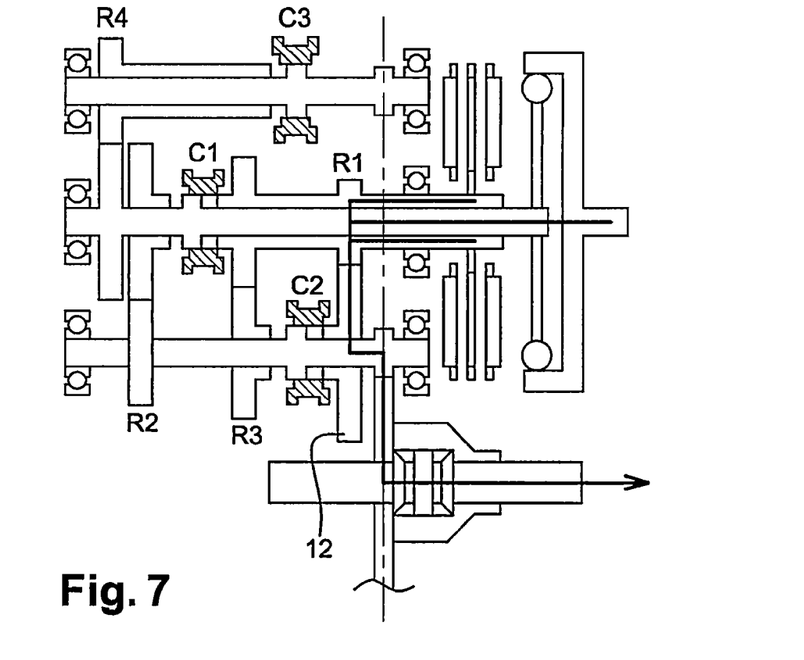
FIG. 7 corresponds to driving in a "hybrid urban low" mode.
Figure 8:
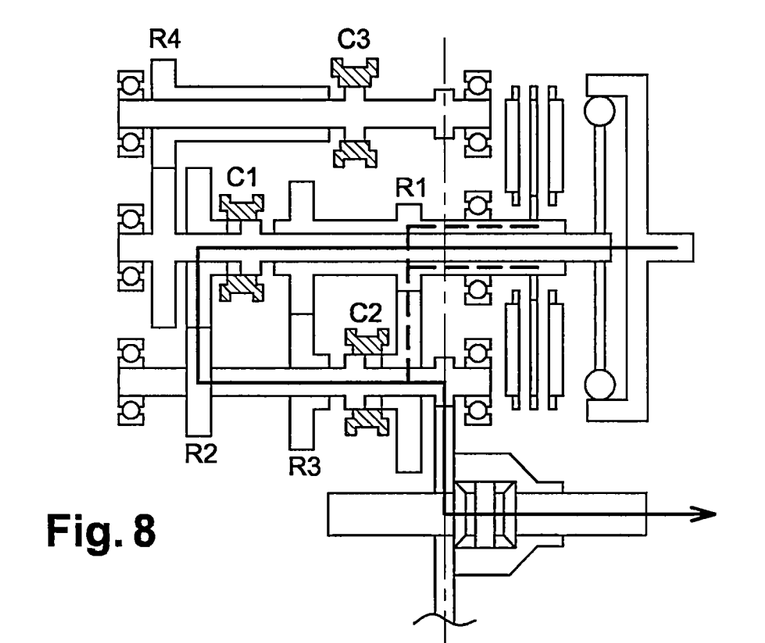
FIG. 8 corresponds to driving in a "hybrid urban high 1" ratio.
Figure 9:
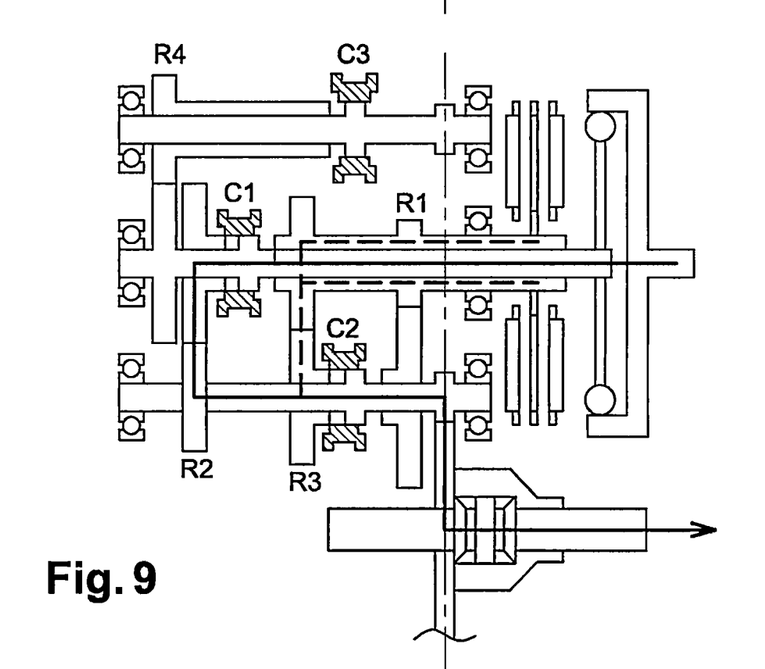
FIG. 9 corresponds to driving in a "hybrid urban high 2" ratio.
Figure 10:
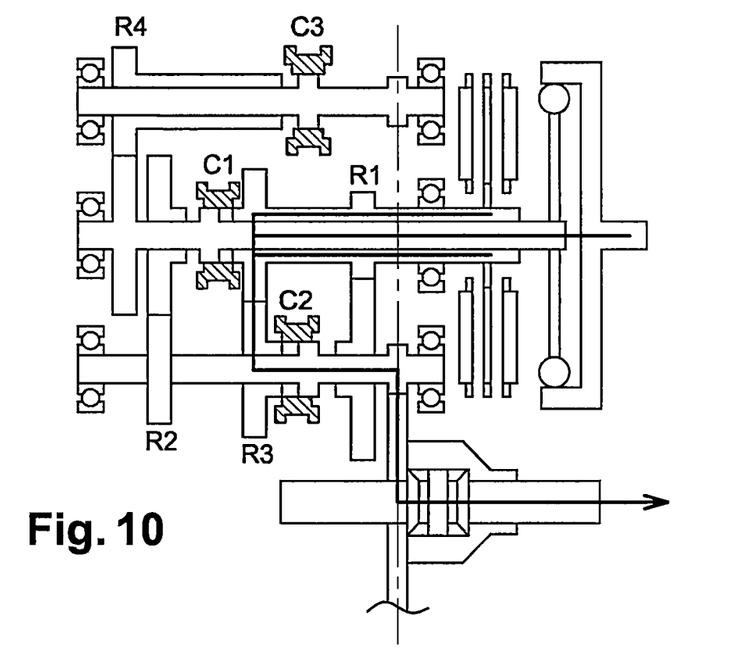
FIG. 10 corresponds to driving in a "hybrid extra-urban" ratio.
Figure 11:
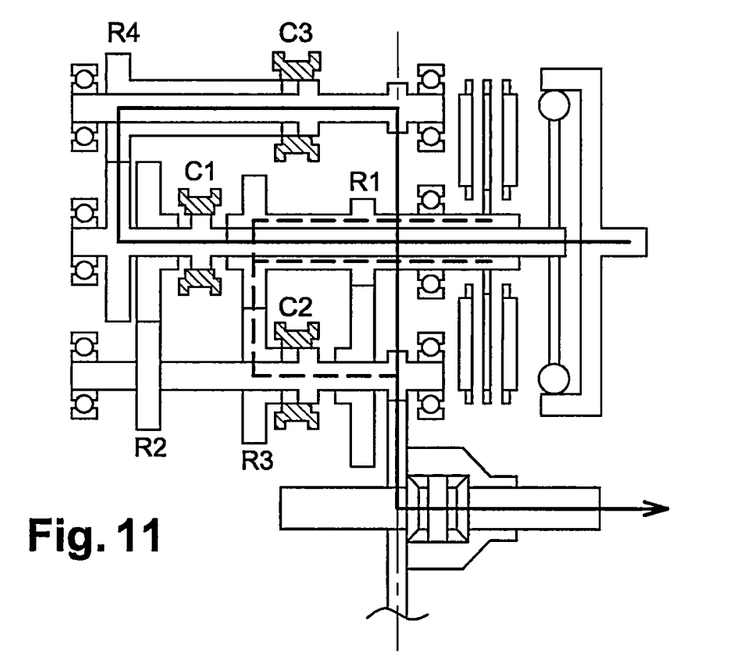
FIG. 11 corresponds to driving in a "hybrid sport" ratio.
Figure 12:
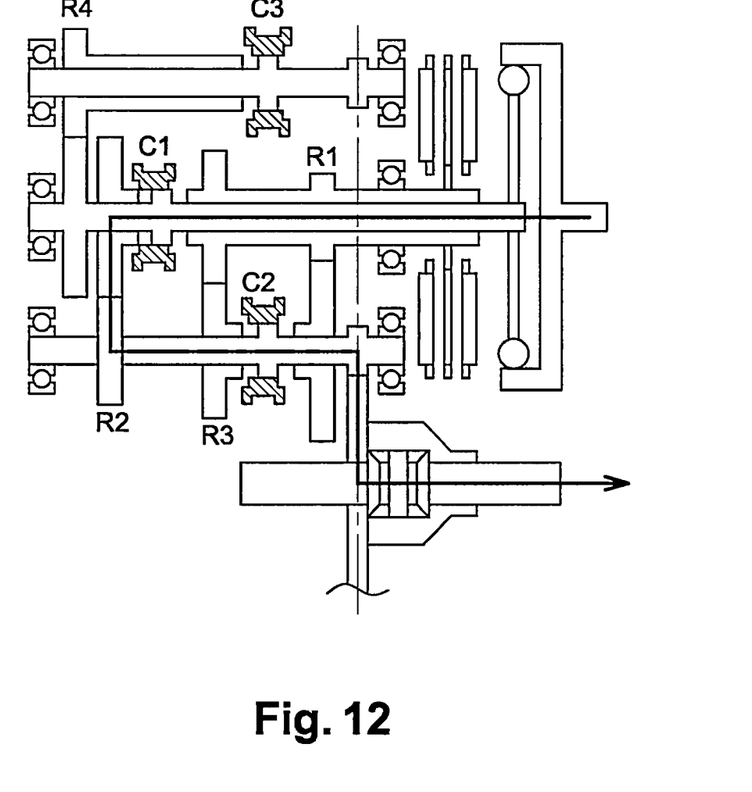
FIG. 12 corresponds to driving in another thermal mode known as "thermal urban high".

The first means of coupling C1 can occupy at least three positions, in which:
  the thermal engine is decoupled from the kinematic chain connecting the electric machine 7 to the wheels, or is coupled to the latter by means of the second secondary shaft (position 1), in FIGS. 1, 2, 3, 5, 11,
  the primary shaft connected to the thermal engine is coupled to the first secondary shaft in order to drive the wheels with or without the contribution made by the electric machine (position 2), in FIGS. 8, 9, 12, and
  the primary shaft connected to the thermal engine is coupled to the primary shaft connected to the electric machine, in such a way as to add together their respective torques in the direction of the wheels (position 3), in FIGS. 4, 6, 7, 10.

Furthermore, the thermal engine may drive an alternator (not illustrated) that is capable of supplying the energy-related needs of the electric machine by charging a high-voltage traction battery. An initial assembly then involves connecting the traction battery to the on-board battery of the vehicle by means of a reversible voltage converter. Another solution is for the alternator to be a high-voltage alternator that is directly connectable to a supply battery of the electric machine. With these provisions, the thermal engine and the alternator for recharging the on-board battery can constitute a low-cost generator that is capable of supplying the energy-related needs of the electric traction machine in electric mode.

Figure 1:
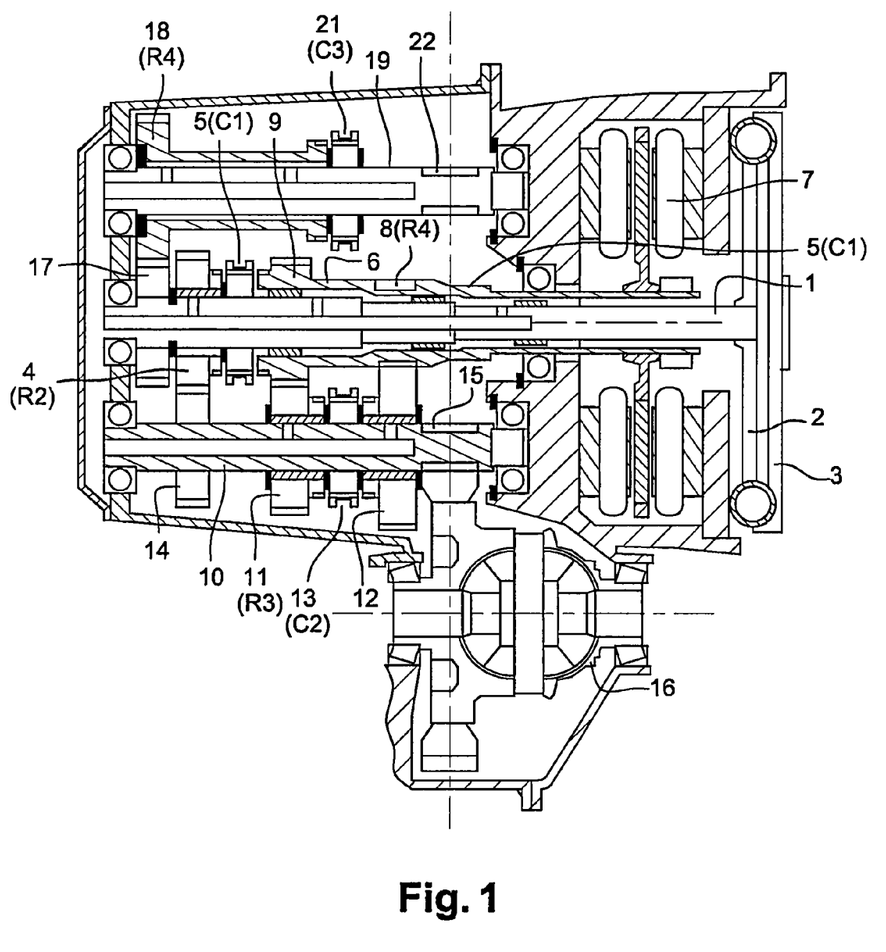
FIG. 1 depicts a diagram of the architecture of the proposed transmission in the neutral position.

In FIG. 1, the three means of coupling C1, C2, C3 are open.

Figure 2:
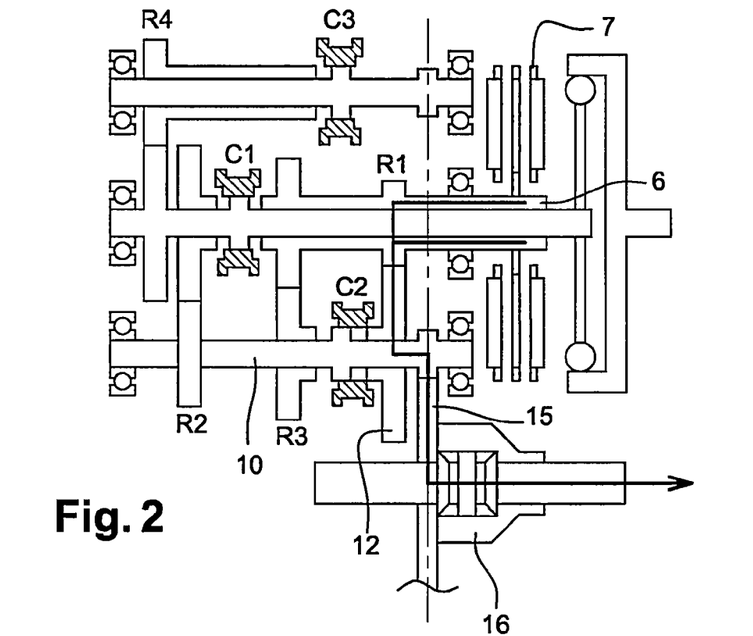
FIG. 2 corresponds to starting and driving in electric mode in an "urban electric" ratio and in reverse.

In FIG. 2, C1 is open (position 1), whereas C2 is closed in such a way as to secure the idler pinion of the first gear 12 firmly to the first secondary shaft 10. The transmission is in electric mode in its first ratio, known as the "electric urban" ratio. The torque supplied by the electric machine to the hollow primary shaft descends via the first fixed pinion RI onto the idler pinion 12. C2 connects the pinion 12 and the shaft 10 in rotation. The torque descends from the secondary line onto the differential 16 via the drive pinion 15.

Figure 3:
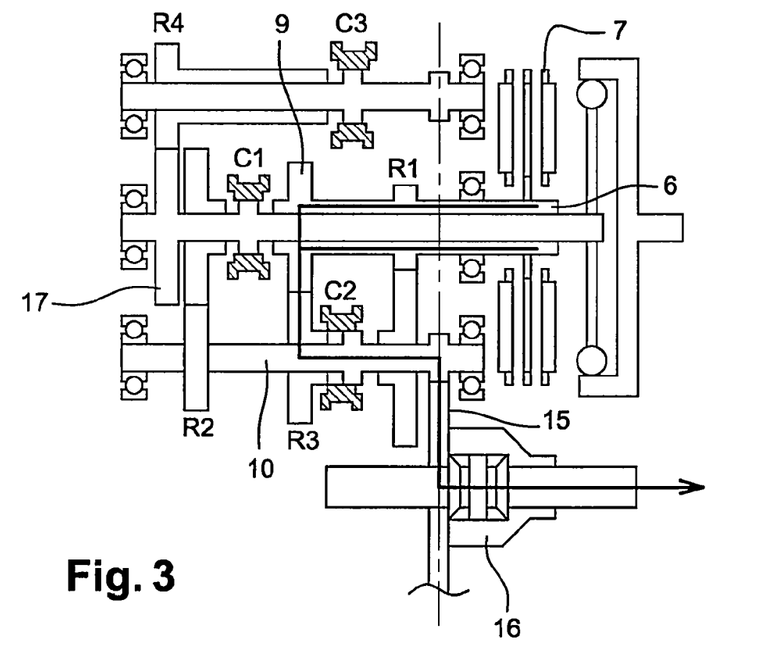
FIG. 3 corresponds to driving in electric mode in an "extra-urban electric" ratio.

In FIG. 3, C1 is still open (position 1), whereas C2 is closed in such a way as to secure the idler pinion of the third gear R3 firmly to the first secondary shaft 10. The transmission is in electric mode in the third ratio of the transmission, known as the "electric extra-urban" ratio. The torque supplied by the electric machine 7 to the hollow primary shaft 6 descends via the fixed pinion for the third gear 9 onto the idler pinion for the third gear R3. C1 connects the pinion R3 and the shaft 10 in rotation. The torque descends from the secondary line onto the differential 16 via the pinion 15.

Figure 4:
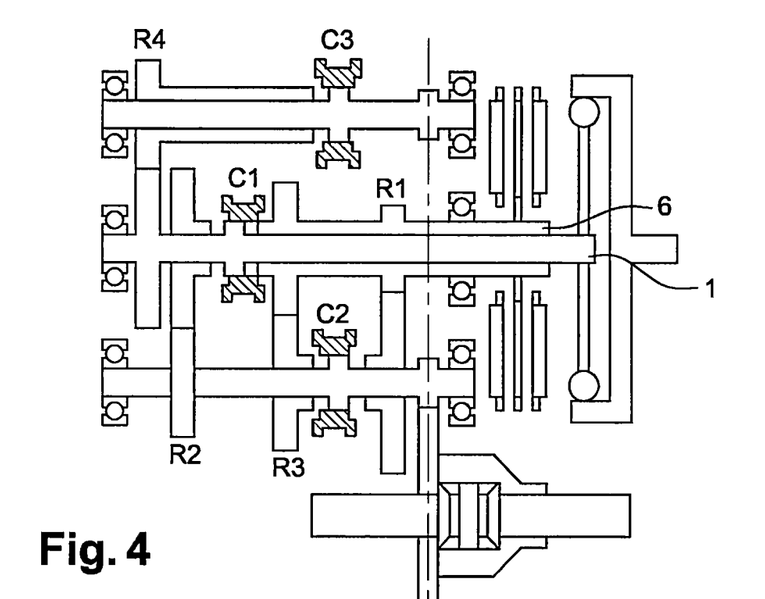
FIG. 4 corresponds to the battery recharging mode.

The battery recharging mode is depicted in FIG. 4. Only C1 5 is closed, in position 3. The two primary shafts 1, 6 are secured firmly together, and the thermal engine drives the electric machine, thereby functioning as a generator.

Figure 5:
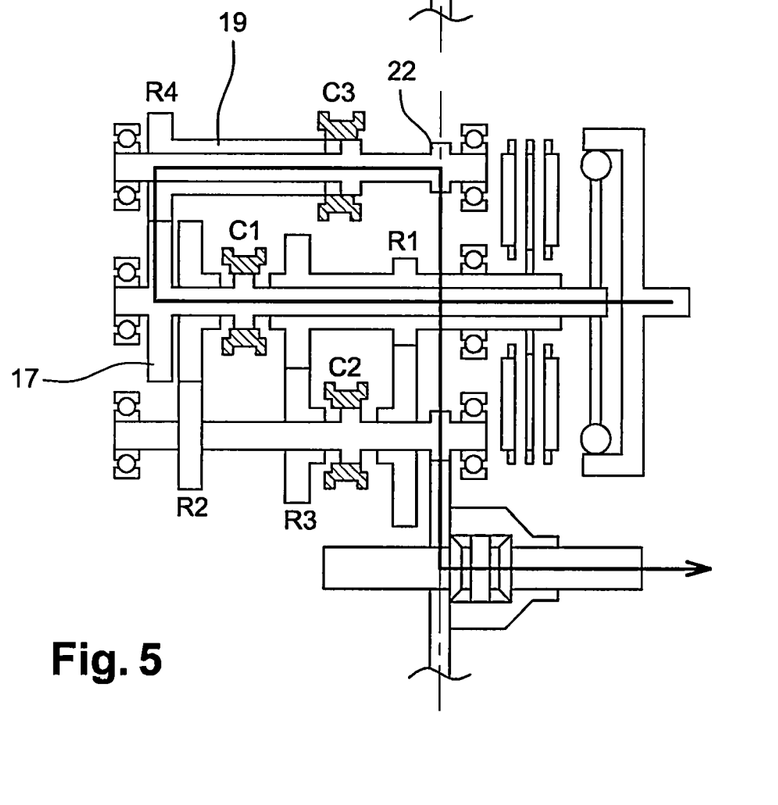
FIG. 5 corresponds to driving in thermal mode in a "thermal freeway" ratio.

In FIG. 5, the transmission is in its fourth ratio, in thermal mode. In this ratio, known as the "thermal freeway" ratio, C1 is open (position 1). Only C3 is closed. The torque supplied by the thermal engine passes onto the second secondary shaft 19 via the fixed pinion 17 and the idler pinion R4 for the fourth gear, and then descends once more onto the differential via the pinion 22.

On the basis of this situation, it is possible to shift into hybrid mode by adding the contribution made by the electric machine to the thermal engine, thanks to the closure of C1 in position 3. The fourth ratio then becomes a "hybrid freeway" ratio, as illustrated in FIG. 6.

Depicted in FIG. 7 is the hybrid mode in the first ratio of the transmission, which in this case becomes a "hybrid urban low" ratio. C1 is closed in position 3, in such a way as to secure the two primary shafts 1, 6 firmly together; C2 is closed in the first ratio (pinions RI, 12). The torques of the thermal engine and the electric machine are thus added together in the first ratio.

FIGS. 8 and 9 illustrate two intermediate hybrid modes, known as "hybrid urban high 1" and "hybrid urban high 2", obtained from the "hybrid urban low" ratio in FIG. 7. By keeping the first ratio engaged on the electric machine, the thermal engine is synchronized to the second ratio before coupling it to the first secondary shaft 10 via the first means of coupling C1 in position 2. As indicated in FIG. 8, the torques are added together.

It is possible to disengage C2, without disengaging C1, and then to synchronize the electric machine with the first secondary shaft 10 before engaging C2 in order to secure them firmly together. With the transmission still in its second ratio, a shift has thus been made to the "hybrid urban high 2" ratio in FIG. 9.

By rocking C1 into position 3 as illustrated in FIG. 9, after synchronization of the thermal engine under no-load conditions, a shift takes place to the third ratio in the situation in FIG. 10, known as "hybrid extra-urban", with the addition of the thermal and electric torques.

It is then possible to shift to the fourth ratio in hybrid mode consistent with FIG. 11, by allowing the electric machine to keep the transmission in the third ratio during the shift. To do this, the C1 coupling is disengaged (return to position 1), and C3 is then closed after having synchronized the thermal engine under no-load conditions.

On the basis of FIG. 10, if C1 is opened, and in order to close C3 while keeping C2 closed, it is possible to engage a "hybrid sport" ratio illustrated by FIG. 11, from which it is possible to shift to the "hybrid freeway" ratio in FIG. 6.

Finally, FIG. 12 illustrates a thermal mode in the second ratio, known as "thermal urban high", in which only C1 is closed in such a way as to cause the torque to descend via R2 onto the second gear ratio.

In summary, the three positions of the first means of coupling 5 and the combined intervention of the second means of coupling 13 and the third means of coupling provide the transmission with at least the following modes:
  an electric mode in the first two ratios of the transmission, known as "electric urban" and "electric low" (see FIGS. 2 and 3);
  a thermal mode in the second ratio and the fourth ratio, known respectively as "thermal urban high" and "thermal freeway" (see FIGS. 12 and 5);
  a hybrid mode in the first ratio, known as "hybrid urban low" (see FIG. 7);

two hybrid modes in the second ratio, known as "hybrid urban 1" and "hybrid urban 2" (FIGS. 8 and 9);

a hybrid mode in the third ratio, known as "hybrid extra-urban" (see FIG. 10) and in the fourth ratio, known as "hybrid freeway" (FIG. 6) and "hybrid sport" (FIG. 11), and a battery recharging mode (see FIG. 4).

The transmission described above finds a particularly advantageous application when it is controlled according to the following two operating sequences, known as "weekly use" and "hybrid use", depending on whether the user wishes to prioritize the electric mode for principally urban or daily driving, or wishes to take further advantage of the hybrid mode in order to increase his autonomy. These modes of use are described below as particularly advantageous, although not restrictive, methods for controlling the described transmission.

"Weekly use" prioritizes the two electric ratios, "electric urban" and "electric extra-urban" associated with the "thermal freeway mode" and possibly with the "hybrid freeway" mode. The two electric ratios are then used by closing C2 on the pinion for first gear or third gear, until a speed threshold is reached, from which a shift takes place to the fourth ratio in thermal mode, by opening C2 and by coupling the thermal engine to the wheels thanks to C3. In the fourth ratio, it is thus also possible to have the hybrid ratio available by coupling the thermal engine to the wheels by closing C3, while at the same time coupling the two primary shafts thanks to C2.

"Hybrid use" is enhanced by the intermediate thermal ratio (second ratio), in particular for changes of ratio under torque. Only one electric ratio is used (on the pinion for first gear), before shifting successively to a plurality of hybrid ratios, where the first two means of coupling C1 and C2 are involved. The first hybrid ratio used on leaving the electric mode is the "hybrid urban low" mode in FIG. 7. It is then possible to shift to the first "hybrid urban high" ratio (hybrid urban high 1) in FIG. 8 to the second (FIG. 9) with the same position of closing of C2, by coupling the hollow primary shaft to the first secondary shaft. If C1 is disengaged, it is possible to benefit from the two "hybrid urban high" ratios 1 and 2, depending on whether C2 engages RI or R3. The "hybrid extra-urban" ratio in FIG. 10 is obtained by coupling the two primary shafts to the third ratio thanks to C1. As indicated above, shifting to the hybrid freeway mode (FIG. 6) can be performed by passing through the intermediate stage of the "hybrid sport" ratio in FIG. 11.

In accordance with the invention, changes in gear between the hybrid ratios are performed under torque. In particular, the whole of the "hybrid use" sequence is performed without interrupting the torque by maintaining the traction during each shift, either by the thermal engine or by the electric machine motor. This is the case for upshifts and downshifts between "hybrid urban low" and "hybrid urban high 1 and 2", "hybrid urban high 2", "hybrid sport" and "hybrid freeway".

The invention claimed is:

1. A hybrid transmission for a motor vehicle that includes a thermal engine and an electric drive machine, comprising:
    two concentric primary shafts, including a first primary shaft directly connected to the thermal engine and a second primary shaft directly connected to the electric machine, each supporting at least one intermediate drive on a first secondary shaft connected to wheels of the vehicle via a differential and a second secondary shaft transmitting movement of at least one of the two primary shafts to the differential;
    a first coupling between the two primary shafts, and the first coupling is configured to move in at least three positions, in which:
    the first coupling, in a first position of the at least three position, is decoupled from a first torque flow path connecting the electric machine to the wheels when the electric machine drives the wheels, and the first coupling is decoupled from a second torque flow path connecting the thermal engine to the wheels when the thermal engine drives the wheels, the second torque flow path including the second secondary shaft,
    the first coupling, in a second position of the at least three position, couples the first primary shaft directly connected to the thermal engine to the first secondary shaft to drive the wheels with or without a contribution made by the electric machine, and
    the first coupling, in a third position of the at least three position, couples the first primary shaft directly connected to the thermal engine to the second primary shaft directly connected to the electric machine, to add together their respective torques in a direction of the wheels.

2. The hybrid transmission as claimed in claim 1, wherein the first primary shaft directly connected to the thermal engine is a solid shaft, and the second primary shaft directly connected to the electric machine is a hollow shaft.

3. The hybrid transmission as claimed in claim 2, wherein the at least one intermediate drive includes two intermediate drives and the first secondary shaft supports a second coupling making it possible to couple one or other of the two intermediate drives of the second primary shaft to idler pinions of the first secondary shaft.

4. The hybrid transmission as claimed in claim 3, wherein the second secondary shaft supports a third coupling permitting the first primary shaft to be coupled to the second secondary shaft.

5. The hybrid transmission as claimed in claim 4, wherein the three positions of the first coupling and combined intervention of the second coupling and of the third coupling provide at least:
    an electric mode on two ratios;
    a thermal mode on a second ratio and a fourth ratio; and
    a hybrid mode on three ratios.

6. The hybrid transmission as claimed in claim 1, wherein the thermal engine drives an alternator that is configured to supply energy-related needs of the electric machine by charging a high-voltage traction battery.

7. The hybrid transmission as claimed in claim 6, wherein the traction battery is connected to an on-board battery of the vehicle by a reversible voltage converter.

8. The hybrid transmission as claimed in claim 6, wherein the alternator is a high-voltage alternator that is directly connectable to a supply battery of the electric machine.

9. A control method for a hybrid transmission as claimed in claim 4, wherein the electric machine is used as a single source of motive energy in two electric ratios by closing the second coupling until a speed threshold is reached, from which a shift takes place to a thermal ratio by opening the second coupling and by coupling the thermal engine to the wheels via the third coupling.

10. The control method as claimed in claim 9, wherein a hybrid ratio is available by coupling the two primary shafts by the second coupling while keeping the thermal engine coupled to the wheels by closing the third coupling.

11. The control method as claimed in claim 9, wherein only one electric ratio is used, before changing successively to a plurality of hybrid ratios, wherein the first coupling and the second coupling are closed.

12. The control method as claimed in claim 11, wherein two hybrid ratios can be obtained with a same position of closing of the second coupling, depending on whether the two primary shafts are coupled, or whether the second primary shaft is coupled to the first secondary shaft.

13. The control method as claimed in claim 11, wherein two distinct hybrid ratios can be obtained with a same position of closing of the first coupling, depending on which of the two intermediate drives the second coupling is coupling with the first secondary shaft.

14. The control method as claimed in claim 9, wherein changes in gear between the hybrid ratios are performed without interrupting torque by maintaining traction during each shift, either by thermal engine or by an electric motor.

15. The hybrid transmission as claimed in claim 1, wherein the first coupling between the two primary shafts includes a dog clutch or a synchronizer.

16. The hybrid transmission as claimed in claim 3, wherein the second coupling between the two primary shafts includes a dog clutch or a synchronizer.

17. The hybrid transmission as claimed in claim 3, wherein
the first coupling between the two primary shafts includes a dog clutch or a synchronizer, and
the second coupling between the two primary shafts includes a dog clutch or a synchronizer.

18. The hybrid transmission as claimed in claim 4, wherein the third coupling between the two primary shafts includes a dog clutch or a synchronizer.

19. The hybrid transmission as claimed in claim 4, wherein
the first coupling between the two primary shafts includes a dog clutch or a synchronizer,
the second coupling between the two primary shafts includes a dog clutch or a synchronizer, and
the third coupling between the two primary shafts includes a dog clutch or a synchronizer.

20. The method as claimed in claim 9, wherein
the first coupling between the two primary shafts includes a dog clutch or a synchronizer,
the second coupling between the two primary shafts includes a dog clutch or a synchronizer, and
the third coupling between the two primary shafts includes a dog clutch or a synchronizer.

* * * * *